(12) United States Patent
Herschleb

(10) Patent No.: US 7,356,812 B2
(45) Date of Patent: Apr. 8, 2008

(54) PASSING PARAMETERS BY IMPLICIT REFERENCE

(75) Inventor: Garrett Herschleb, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 10/677,081

(22) Filed: Sep. 30, 2003

(65) Prior Publication Data

US 2005/0071846 A1    Mar. 31, 2005

(51) Int. Cl.
*G06F 9/45* (2006.01)

(52) U.S. Cl. .................................... 717/159

(58) Field of Classification Search ................ 717/128, 717/147, 156–159; 712/202, 228; 714/45
See application file for complete search history.

(56) References Cited

OTHER PUBLICATIONS

Tomasz Muldner, 'C++ Programming with Design Pattern Revealed', <http://www.cs.helsinki.fi/u/vihavain/s03/cpp/Muldner/c++Ch2.ppt> Addison Wesley, Copyright 2002, pp. 1-42.*
R. Stallman, GNU CC, 'Using and Porting GNC CC', <http://web.umr.edu/~gnudoc/split/egcs/gcc_toc.html> copyright 1988-1996 (TOC; Part 1: Target Description Macros pp. 1-40; Part 2: Defining the Output Assembler Language, pp. 51-66).*

\* cited by examiner

*Primary Examiner*—Tuan A Vu
(74) *Attorney, Agent, or Firm*—Schwegman, Lundberg & Woessner, P.A.

(57) ABSTRACT

In an embodiment, a method includes receiving a program code that includes a first calling function having a call instruction to call a first called function that passes, by reference, a variable as a parameter of a number of parameters. The method also includes compiling the program code to generate compiled instructions. The compiled instructions do not include a compiled instruction to load the variable onto a call stack, during execution, based on the call instruction.

27 Claims, 8 Drawing Sheets

```
102 ~  int A ()        ← 100
       {
104 ~    int x = 1;

106 ~    int y = 2;

108 ~    int z = 3;

214 — 0x0E8    RTN

```
        ⎧  int  A (const int &a0, const int &a1)
        ⎪  {
402 ⎨  406 ─ return (a1 + a0 * 2);
        ⎪  }
        ⎩
```

```
        ⎧  int  main (int argc, char *argv[])
        ⎪  {
        ⎪ 408 ─ int x, y;
        ⎪
        ⎪ 410 ─ x = 1;
404 ⎨
        ⎪ 412 ─ y = 1;
        ⎪
        ⎪ 414 ─ printf("A = %d\n", A(x,y));
        ⎪
        ⎪ 416 ─ return 0;
        ⎩  }
```

506 ─ 0x0F8    RTN

A_FRCiT0:
    606 { .LFB1:
           psuhl  %ebp

608 { .LCFI0:
           movl  %esp, %ebp

.LCFI1:
      612 — movl  12(%ebp), eax
      614 — movl  8(%ebp), edx
      616 — # Removed: movl (%eax), %eax
610 { 618 — sall $1, %eax
      620 — # Modified to the instruction below (from this): addl (%edx), %eax
      622 — addl  %edx, %eax
      624 — popl  %ebp
      626 — ret

*FIG. 6A* main:

640

642 { .LFB2:
    psuhl %ebp

644 { .LCFI2:
    movl %esp, %ebp

646 { .LCFI3:
    subl $8, %ebp

648 {
.LCFI4:
  660 — movl $1, -4(%ebp)
  662 — movl $2, -8(%ebp)
  664 — # Removed: subl $8, %esp
  667 — # Removed: leal -8(%ebp), %eax
  668 — # Removed: pushl %eax
  670 — # Removed: leal -4(%ebp), %eax
  672 — # Removed: psuhl %eax 650 {
.LCFI5:
  674 — call A_FRCiT0
  676 — #Removed addl $8, %ebp
  678 — pushl %eax
  680 — pushl $.LC0

*FIG. 6B*

… # PASSING PARAMETERS BY IMPLICIT REFERENCE

TECHNICAL FIELD

This invention relates generally to compilation and execution of computer programs and more particularly, to passing parameters by implicit reference.

BACKGROUND

Conventional compilers of computer programs use a stack to pass parameters between functions within the computer programs. The stack provides an effective means of managing memory for local variables and communicating parameters among functions. However, the passing of parameters (using the stack) during the execution of computer programs may become time consuming and thereby affect the performance of the application executing such programs. Additionally, in certain applications and/or systems executing such applications, the memory storing the stack and the ability of a processor to manipulate the stack are limited. Moreover, a number of programs are designed to include numerous function calls. For example, a same function may be executed numerous times based on a function call by a different function during execution of a program.

To illustrate, FIG. 1 shows an example of C source code. FIG. 1 illustrates a code segment 100 that includes instructions 102-110. The instruction 102 is the function header. The instruction 104 defines an integer variable "x" and initializes this variable to one. The instruction 106 defines an integer variable "y" and initializes this variable to two. The instruction 108 defines an integer variable "z" and initializes this variable to three. The instruction 110 calls a function B that includes passing the variables "x", "y" and "z" by reference.

FIG. 2 illustrates a call stack generated by the execution of the C source code example of FIG. 1, according to the prior art. As shown, FIG. 2 illustrates a call stack 200. In a stack entry 202, the variable "x" is pushed on the call stack 200 at address 0x100. The creation of the stack entry 202 corresponds to the execution of the instruction 104. In a stack entry 204, the variable "y" is pushed on the call stack 200 at address 0x0FC. The creation of the stack entry 204 corresponds to the execution of the instruction 106. In a stack entry 206, the variable "z" is pushed on the call stack 200 at address 0x0F8. The creation of the stack entry 206 corresponds to the execution of the instruction 108.

The execution of the function call at the instruction 110 creates stack entries 208-216, which are now described. In the stack entry 208, the variable "z" is pushed on the call stack 200 at address 0x0F4. In the stack entry 210, the variable "y" is pushed on the call stack 200 at address 0x0F0. In the stack entry 212, the variable "x" is pushed on the call stack 200 at address 0x0E0. In the stack entry 214, the program counter is pushed on the call stack 200 to allow for return to the instruction after the completion of the function call to "B" at the instruction 110. In the stack entry 216, the base pointer value for the function "A" is pushed on the call stack 200 at address 0x0E4. This base pointer value for the function "A" is restored after the execution of the function "B" is complete. Stack entry 218 is the location of the stack pointer after the execution of the function "B" is complete (at address 0x0E0).

As shown, when the function "A" calls the function "B", all three variables x "y" and "z" are copied onto the stack prior to execution of the function "B". The instructions in function "B" may make reference to the three variables "x", "y" and "z" during execution. When the function "B" has completed execution, the copies of the variables "x", "y" and "z" are "popped" off the stack. Thus, copies of the three variables "x", "y" and "z" were "pushed" onto the stack so that instructions in function "B" could make reference to such variables from a fixed location relative to the base pointer of function "B". Thus, as described, both call stack resources and processor resources are required to load the variables passed by reference from the calling function to the called function.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a code segment 100 can be located in FIG. 1. However, reference numbers are the same for those elements that are the same across different Figures. In the drawings:

FIG. 1 shows an example of C source code.

FIG. 2 illustrates a call stack generated by the execution of the C source code example of FIG. 1, according to the prior art.

FIG. 4 illustrates a call stack based on execution of code wherein parameters are passed by implicit reference, according to one embodiment of the invention.

FIG. 5 illustrates an example of C source code associated with the call stack of FIG. 4, according to one embodiment of the invention.

FIG. 6A-6B illustrate compiled assembly code based on the C source code of FIG. 5, according to one embodiment of the invention.

DETAILED DESCRIPTION

Figure 3:
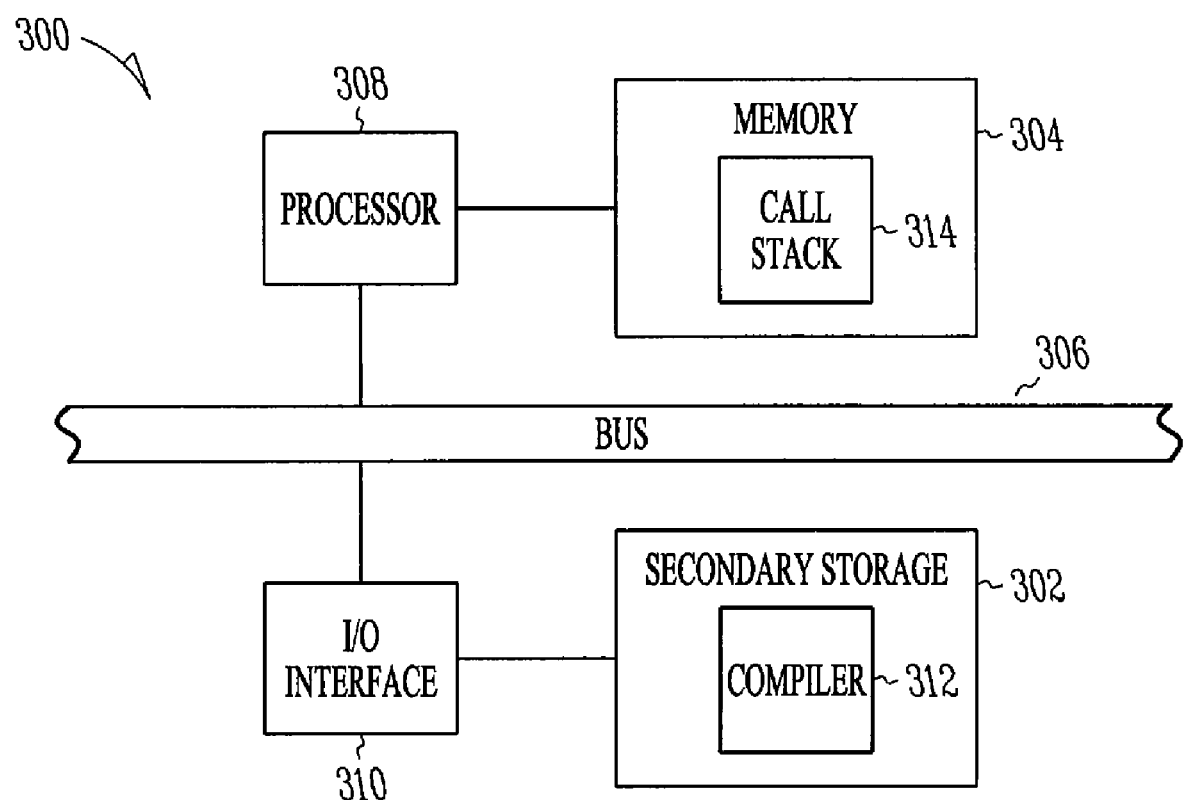
FIG. 3 illustrates a system for passing parameters by implicit reference, according to one embodiment of the invention.

Methods, apparatuses and systems for passing parameters by implicit reference are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for passing parameters by implicit reference, in accordance with embodiments of the invention. A number of figures show flow diagrams illustrating operations for passing parameters by implicit reference. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

FIG. 3 illustrates a system for passing parameters by implicit reference, according to one embodiment of the invention. Although described in the context of a computer system 300, embodiments of the invention may be implemented in any suitable system comprising any suitable integrated circuit(s).

As illustrated in FIG. 3, the computer system 300 comprises a processor 308, a memory 304, an I/O interface 310, a secondary storage 302 and a bus 306. The processor 308 is coupled to the memory 304. The processor 308 and the I/O interface 310 are coupled together through the bus 306. The secondary storage is coupled to the I/O interface 310.

In an embodiment, the memory 304 may be different types of random access memory (RAM). For example, the memory 304 is a Dynamic RAM (DRAM), Synchronous Dynamic RAM (SDRAM), double data rate (DDR) SDRAM, etc. In an embodiment, the bus 306 may be a Peripheral Component Interface (PCI) bus. In one embodiment, the processor 308 may be different types of general purpose processors. The I/O interface 310 provides an interface for the secondary storage 302 into the system 300. In an embodiment, the secondary storage 302 may be any of a number of different types of hard drives. In one embodiment, the secondary storage 302 is an integrated drive electronics (IDE) drive, such as a hard disk drive (HDD) or compact disk read only memory (CD ROM) drive for example.

Additionally, the I/O interface 310 may provide an interface to other I/O devices or peripheral components for the system 300. For example, the I/O interface 310 for one embodiment also provides an interface to a keyboard, a mouse, one or more suitable devices, such as a printer for example, through one or more ports. The I/O interface 310 may provide an interface to one or more remote devices over one of a number of communication networks (the Internet, an Intranet network, an Ethernet-based network, etc.).

The I/O interface 310 may comprise any suitable interface controllers to provide for any suitable communication link to different components of the system 300. The I/O interface 310 for one embodiment provides suitable arbitration and buffering for one of a number of interfaces.

While the memory 304 and the secondary storage 302 are shown to store a call stack 314 and a compiler 312, respectively, embodiments of the invention are not so limited. In particular, as is known, a part of or the entire call stack 314 may be stored in virtual memory within the secondary storage 302 and/or cache memory (not shown) in the processor 308. Moreover, a part of or the entire compiler 312 may be stored in the memory 304 and/or the processor 308 during execution of the compiler 312.

The call stack 314 is a data structure used to pass parameters between function (procedures) within the program code. Therefore, the call stack 314 provides for communication among functions and management of memory for local variables in the different functions. Additionally, the call stack 314 stores the return address values for the calling function to return execution to the appropriate place therein.

While the compiler 312 is described as being a software application being executed by the processor 308, the compiler 312 may be hardware or a combination of software and hardware. Accordingly, the compiler 312 may be hardware that may execute independent of the processor 308.

As further described below, the processor 308 executes the compiler 312 to compile a program source code to generate an executable program, according to one embodiment of the invention. As part of the compilation, the compiler 312 generates assembly code instructions that are used to generate the executable program. The assembly code includes instructions that allow for the passing of parameters by implicit reference for function (subroutine) calls during execution of the executable program (generated based on such assembly code). As further described below, the assembly code does not include instructions to push parameters (called by reference) onto the call stack 314 as part of the function calls. Moreover, the assembly code instructions that correspond to the instructions within the function being called are modified to reference the parameters passed by reference at a different location on the call stack.

Accordingly, such implicit reference may increase the speed of execution time. Moreover, these implicit reference operations may decrease the size of the executable program in cases where a function is called numerous times and/or from numerous sources during execution. In one embodiment, the processor 308 and/or a different computing device executes the executable program generated from the program source code, according to an embodiment of the invention.

Figure 7:
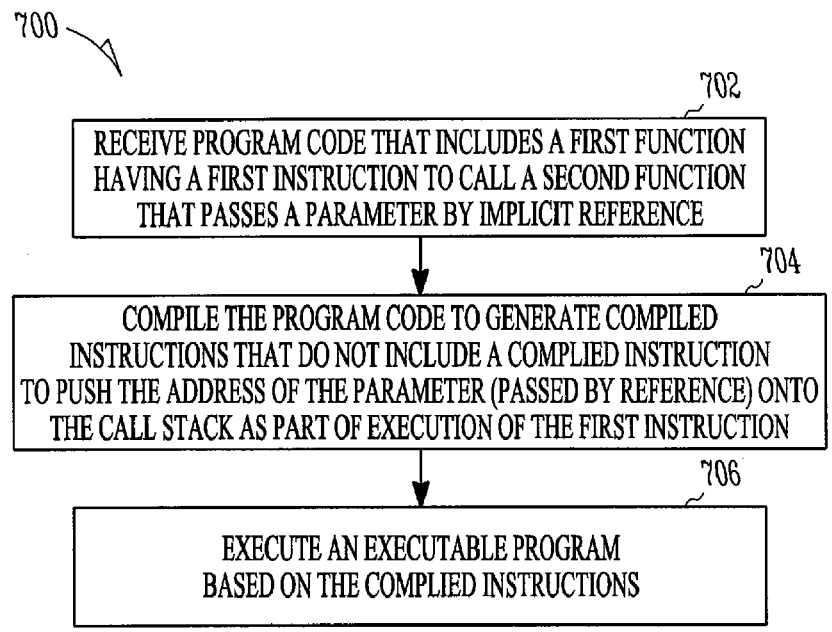
FIG. 7 illustrates a flow diagram that includes passing parameters by implicit reference, according to one embodiment of the invention.
Figure 8:
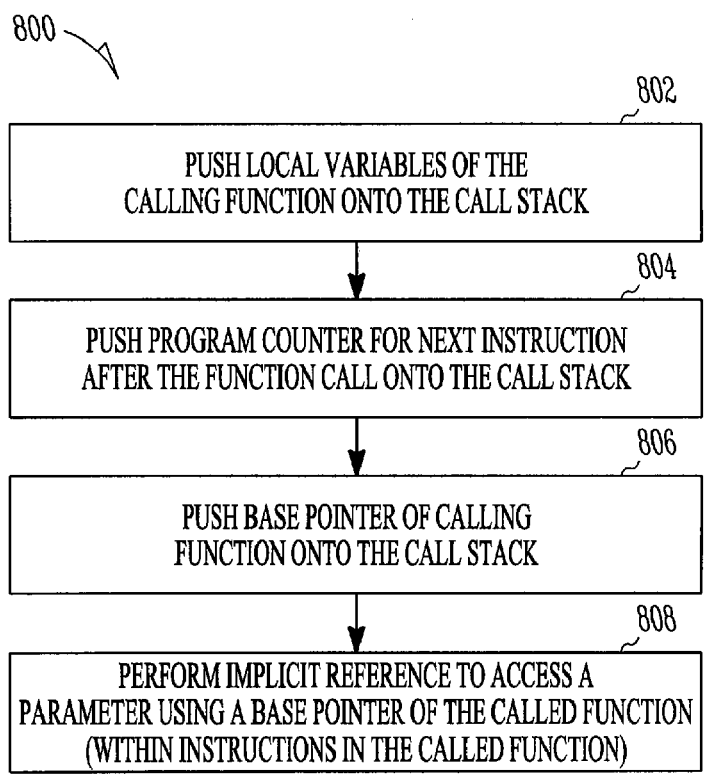
FIG. 8 illustrates a flow diagram for executing a program code that includes passing parameters by implicit reference, according to one embodiment of the invention.
Figure 9:
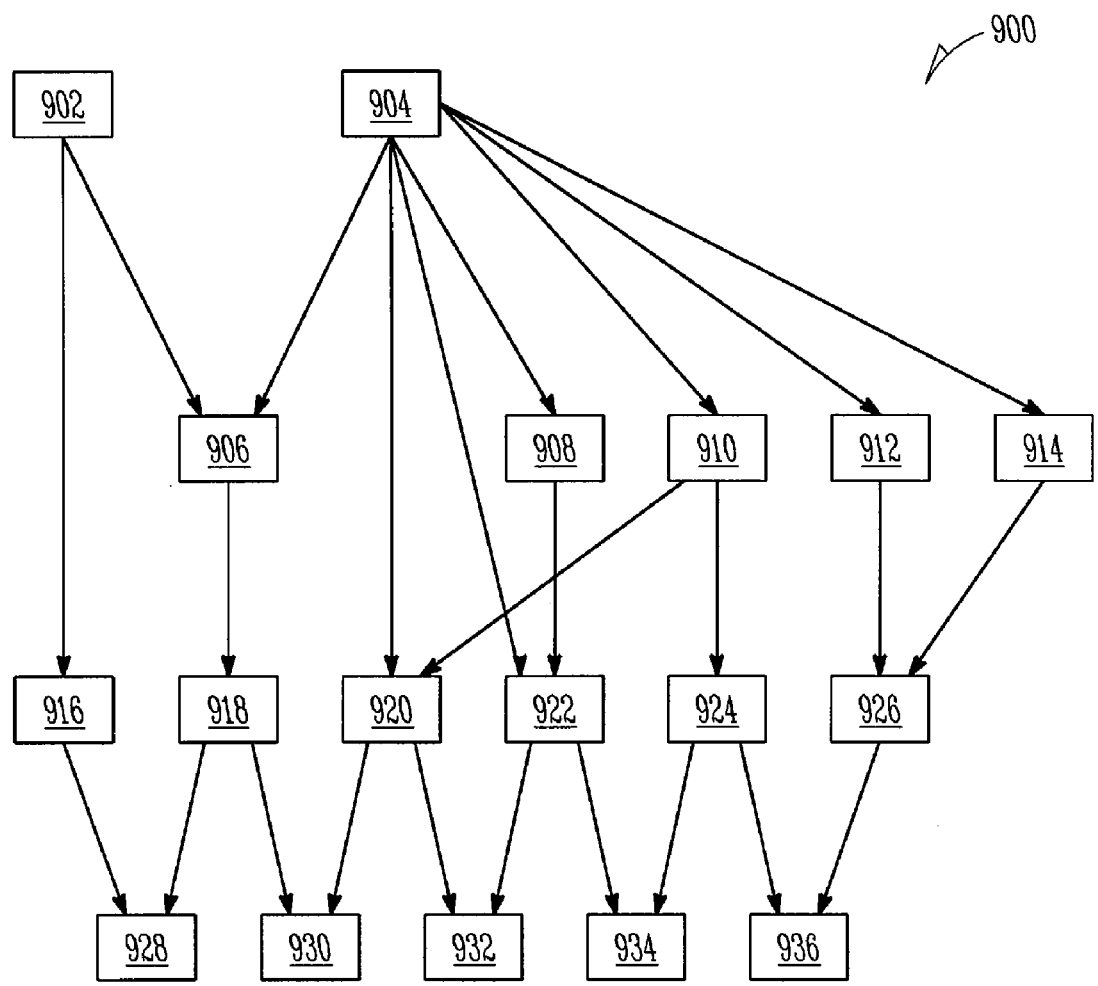
FIG. 9 illustrates a call tree for a program, according to one embodiment of the invention.

The operations of the system 300 are described in conjunction with FIGS. 4-9. In particular, FIGS. 4, 5 and 6 illustrate, respectively, an example source code, a call stack and a compiled assembly code, according to an embodiment of the invention. FIGS. 7-8 illustrate flow diagrams that show operations for passing parameters by implicit reference, according to embodiments of the invention. Such flow diagrams are described with reference to the example source code, call stack and compiled assembly code of FIGS. 4, 5 and 6. FIG. 9 illustrates a call tree generated by the compiler 312 used to determine which functions and/or variables passed by reference between functions are converted to variables passed by implicit reference, according to an embodiment of the invention.

FIG. 4 illustrates an example of C source code, according to one embodiment of the invention. FIG. 4 illustrates a source code 400 that includes a code segment 402 and a code segment 404.

The code segment 402 is a function "A" that receives a first parameter "a0" by reference and a second parameter "a1" by reference. The function "A" includes an instruction 406 that multiplies "a0" by two and adds the result to "a1". The instruction 406 is an access instruction that accesses the parameters "a0" and "a1" from the call stack 314 using the base pointer for function "A" (which is described in more detail below). This instruction also returns as a result for function "A" the output of these multiply and add operations.

The code segment 404 is the "main" function. As shown, the "main" function includes instructions 408-416. The instruction 408 (which is a declaration instruction) defines/allocates an integer variable "x" and an integer variable "y". The instruction 410 initializes the variable "x" to a value of one. The instruction 412 initializes the variable "y" to a value of two. The instruction 414 is a print function that outputs a string, which includes the result of returned after execution of function "A". The instruction 414 is a call instruction to the function "A". The instruction 416 is the return instruction for completion of "main". As shown, the variables "x" and "y" are passed by reference to function "A". As further described below, this passing of variables "x" and "y" are passed by implicit reference, according to one embodiment of the invention.

FIG. 5 illustrates a call stack generated by execution of the C source code of FIG. 4, wherein parameters are passed by implicit reference, according to one embodiment of the invention. As shown, FIG. 5 illustrates a call stack 500, which is one embodiment of the call stack 314 (of FIG. 3). In a stack entry 502, the variable "x" is pushed onto the call stack 500 at address 0x100. The creation of the stack entry 502 corresponds to the execution of the instructions 408 and 410 (for variable "x"). In a stack entry 504, the variable "y" is pushed onto the call stack 500 at address 0xFC. The creation of the stack entry 504 corresponds to the execution of the instructions 408 and 410 (for variable "y").

The execution of instruction 414 to call function "A(x,y)" creates stack entries 506-510, which are now described. In the stack entry 506, the program counter is pushed on the call stack 500 to allow for the return to the instruction after the completion of the function call to "A" (the instruction 416) at address 0xF8. In the stack entry 508, the base pointer value for the function "main" is pushed on the call stack 500 at address 0x0F4. This base pointer value for the function "main" is restored after the execution of the function "A" is complete. Stack entry 510 is the location of the stack pointer after the execution of the function "A" is complete (at address 0x0F0).

As shown, when the function "main" calls the function "A", neither the variable "x" nor the variable "y" (which are passed by implicit reference) are pushed onto the call stack 500. This is in contrast to conventional parameter passing (shown in FIG. 2) wherein parameters passed by reference are pushed onto the call stack. Moreover, as described in more detail below in conjunction with FIG. 6, the compiler 312, which generates the assembly code, does not generate instructions to load the parameters passed by implicit reference onto the call stack 314. Additionally, the compiler 312 modifies the instructions that reference (access) these variables. In particular, the compiler 312 causes the referencing using the base pointer for the called function at an offset on the call stack 314. The instructions generated by the compiler 312 are such that the variables are accessed on the call stack 314 at an offset from the base pointer for the called function to the copies of the variables pushed onto the call stack during the allocation by the calling function. While described with reference to accessing the variables based on an offset of the base pointer of the called function, embodiments of the invention are not so limited. In particular, the variables on the stack may be accessed based on other common references. For example, the variables on the stack may be accessed based on a common reference on the stack (e.g., the location of the base pointer of the calling function on the stack).

With reference to the call stack 500, the compiler generates instructions to access "x" and "y" at the stack entries 502 and 504, respectively. In other words, the instructions to reference these variables are based on an offset from the base pointer on the call stack 500 (at the stack entry 508) to the stack entries 502 and 504 that were created based on allocation of the variables in the called function.

As described, the execution time for the program as well as the amount of program space for the executable program may be reduced because of fewer instructions. Such reduction is increased as the number of times a function (having parameters that are passed by reference) is called is increased.

FIG. 6A-6B illustrate compiled assembly code based on the C source code of FIG. 4, according to one embodiment of the invention. In particular, FIG. 6A illustrates the compiled assembly code for the function "A", while FIG. 6B illustrates the compiled assembly code for the function "main".

As shown, a number of the assembly code instructions are commented out (not executable assembly code instructions) using the symbol "#". These commented out instructions help to illustrate how the compiler 312 is modified to output different assembly code instructions to allow for passing parameters by implicit reference, according to one embodiment of the invention. These commented out instructions indicate that the instructions have been "removed" or have been "modified". A "removed" commented out instruction is not generated by the compiler 312 (but is shown to help illustrate embodiments of the invention). A "modified" commented out instruction is also not generated by the compiler 312 (but is shown to help illustrate embodiments of the invention) and is replaced by the following instruction.

FIG. 6A illustrates assembly code 600 that is generated based on compilation of the function "A". The assembly code 600 includes an assembly code segment 606, an assembly code segment 608 and an assembly code segment 610.

The assembly code segment 606 includes an assembly code instruction that pushes the base pointer (% ebp) of the calling function onto the call stack. The assembly code segment 608 includes an assembly code instruction that moves an address (% esp) into the base pointer (% ebp). In other words, this instruction assigns a local value for the function "A" to the base pointer, which is a global register used during execution across the different functions of the program.

The assembly code segment 610 includes a number of instructions (instructions 612-626). The assembly code instruction 612 moves a first value passed by reference (the address of "a0") from the call stack to a register (eax). The assembly code instruction 614 moves a second value passed by reference (the address of "a1") from the call stack to a register (edx). Accordingly, the parameters passed by reference ("a0" and "a1") are retrieved from the stack based on an offset from the base pointer for the called function. In particular, the parameter "a0" is at an offset of 12 bytes from the base pointer. This parameter is loaded into the register (eax). The parameter "a1" is at an offset of eight bytes from the base pointer. This parameter is loaded into the register (edx).

The "removed" commented out instruction 616 is an instruction that was generated by a compiler using conventional approaches, but is no longer needed when passing parameters by implicit reference, according to an embodiment of the invention. In particular, such an instruction had been used to load the value for "a0" that was dereferenced (based on the address for a0 that was on the call stack 314) into the register (eax). However, this dereference operation is no longer needed because "a0" has been copied from the call stack 314 using the base pointer for function "A" (the called function). The instruction 618 is the multiply operation for the instruction 406 ("a0*2").

The "modified" commented out instruction 620 is replaced by the subsequent instruction (the instruction 622). In other words, the instruction:

$$addl\ (\%\ edx),\%\ eax \quad (1)$$

is replaced by the instruction:

$$addl\ \%\ edx,\%\ eax \quad (2)$$

Accordingly, the compiler 312 generates the instruction 622 instead of the instruction 620. As shown, this modification is made because the dereference operation is no longer needed because "a1" has been copied from the call stack 314 using the base pointer for the function "A" (the called function). The instruction 622 pops the base pointer off the call stack. The instruction 626 is the return instruction for the function "A".

With regard to FIG. 6B, an assembly code segment 640 illustrates the assembly code instructions for the function "main". The assembly code segment 640 includes an assembly code segment 642, an assembly code segment 644, an assembly code segment 646, an assembly code segment 648 and an assembly code segment 650.

The assembly code segment 642 includes an assembly code instruction that pushes the base pointer (% ebp) of the calling function onto the call stack. The assembly code segment 644 includes an assembly code instruction that moves an address (% esp) into the base pointer (% ebp). In other words, this instruction assigns a local value for the function "main" to the base pointer, which is a global register used during execution across the different functions of the program. The assembly code segment 646 includes an assembly code instruction that allocates eight bytes on the call stack for the variables "x" and "y" based on the instruction 408 wherein such variables are defined.

The assembly code segment 648 includes assembly code instructions 660-672. The assembly code instruction 660 assigns a value of one to the variable "x" that is on the call stack (based on an offset of four bytes from the base pointer). The assembly code instruction 662 assigns a value of two to the variable "y" that is on the call stack (based on an offset of eight bytes from the base pointer).

The "removed" commented out instructions 664-572 are instructions that were generated by a compiler using conventional approaches, but are no longer needed when passing parameters by implicit reference, according to an embodiment of the invention. The "removed" commented out instruction 664 was generated by conventional compilers to allocate eight bytes on the call stack 500 for the parameters passed by reference. The "removed" commented out instructions 667-668 were generated by conventional compilers to load the address of the variable "x", which is being passed by reference. The "removed" commented out instructions 670-672 were generated by conventional compilers to load the address of the variable "y", which is being passed by reference. As shown, in an embodiment, the compiler 312 does not generate assembly code instructions to allocate space on the call stack 500 or assembly code instructions to push parameters called by reference for a function call onto the call stack 500.

The assembly code segment 650 includes assembly code instructions 674-680. The assembly code segment 650 relates to the calling of function "A" (at instruction 414) and clean up of the call stack 500 after execution of this function. The assembly code instruction 674 causes the execution of the assembly code instructions at assembly code 600 of FIG. 6A (for execution of function "A"). The "removed" commented out instruction 676 was generated by conventional compiler to add a value of eight to the base pointer, which corresponded to the subtraction of a value of eight to the base pointer at the "removed" commented out instruction 676. The assembly code instructions 678 and 680 push the address of register "eax" (which is the return value for function "A") and the value of ".LC0" onto the call stack 500 (which are not shown in FIG. 5) for the printf instruction of the instruction 414.

FIG. 7 illustrates a flow diagram that includes passing parameters by implicit reference, according to one embodiment of the invention. The flow diagram 700 is described with reference to the operations of the system 300 in FIG. 3 in conjunction with the source code, call stack and assembly code of FIGS. 4-6, respectively.

In block 702, program code is received that includes a first function having a first instruction to call a second function that passes a parameter by reference. With reference to the embodiment of FIG. 3, the processor 308 executes the compiler 312. The compiler 312 may receive the program code from a number of sources including the memory 304, the secondary storage 302, etc. In an embodiment, the program code may be code that is based on a number of different types of languages. For example, the program code may be C source code, C++ source code, Pascal source code, Fortran source code, etc. While described such that the program code is based on a high level language, embodiments of the invention are not so limited. For example, the program code may be lower level code (a different type of assembly code) that may be compiled by the compiler 312, according to embodiments of the invention. Moreover, a programmer may directly write an assembly code program, according to embodiments of the invention.

The first instruction in the first function calls the second function with at least one parameter that is passed by implicit reference. In other words, the address of the parameter and not the value of the parameter is passed. Accordingly, modifications made by the second function are seen by the first function. Any of a number of parameters may be passed by reference. Moreover, the first function may call the second function with any combination of parameters passed by reference and parameters passed by value. Control continues at block 704.

In block 704, the program code is compiled to generate compiled instructions (assembly code instructions) that do not include (i.e., eliminate) a compiled instruction to push the address of parameter (passed by reference) onto the call stack, as part of execution of the first instruction. With reference to the embodiment of FIG. 3, the compiler 312 generate compiled instructions that do not include a compiled instruction to push the address of the parameter (passed by reference) onto the call stack 314, as part of the execution of the first instruction. With reference to the assembly code segment 640 of FIG. 6B, the assembly code segment 648 does not include the instructions 664-672 (that were shown for purposes of illustration but have been commented out). Moreover, in an embodiment, the compiler 312 also generates a machine-dependent executable program based on the assembly code instructions. Control continues at block 706.

In block 706, an executable program based on the compiled instructions is executed. With reference to the embodiment of FIG. 3, the processor 308 may link in functions/libraries that are external to the executable program. The processor 308 then loads and executes the executable program. A more detailed description of the execution of an executable program, according to one embodiment of the invention, is now described.

In particular, FIG. 8 illustrates a flow diagram for executing a program code that includes passing parameters by implicit reference, according to one embodiment of the invention. The flow diagram 800 is described with reference to the operations of the system 300 in FIG. 3 in conjunction with the source code, call stack and assembly code of FIGS. 4-6, respectively.

In block 802, local variables of the calling function are pushed onto the call stack. With reference to the source code 400 of FIG. 4, the calling function is the main function of the code segment 404. As part of defining the local variables (x,y) at instruction 408, the processor 308 pushes these local variables onto the call stack 314. This push operation is also illustrated by assembly code instruction in the assembly code segment 646 in FIG. 6B (as described above). With reference to the call stack 500 of FIG. 5, this push operation is illustrated by the stack entries 502 and 504 (as described above). Control continues at block 804.

In block 804, the program counter for the next instruction after the function call is pushed onto the call stack. With reference to the source code 400 of FIG. 4, the processor 308 pushes (onto the call stack 500) the program counter for the next instruction during the execution of the function call ("A(x,y)") within the instruction 414. With reference to the call stack 500 of FIG. 5, this push operation is illustrated by the stack entry 506 (as described above). Accordingly, the processor 308 is executing the instructions of the called function. Moreover, after pushing the program counter onto the call stack, the processor 308 sets the program counter to the beginning of the called function. Control continues at block 806.

In block 806, the base pointer of the calling function is pushed onto the call stack. With reference to the source code 400 of FIG. 4, the processor 308 pushes (onto the call stack 500) the base pointer of the calling function during the execution of the function call ("A(x,y)") within the instruction 414. With reference to the call stack 500 of FIG. 5, this push operation is illustrated by the stack entry 508 (as described above). Control continues at block 808.

In block 808, an implicit reference is performed to access a parameter using the base pointer of the called function (based on execution of instructions in the called function). With reference to the source code 400 of FIG. 4, the processor 308 performs an implicit reference to access the parameters "a0" and "a1" during execution of the instruction 406. With reference to FIG. 6A, this access of "a0" is illustrated by access to the register "eax" in the instructions 618 and 622. The register "eax" had been loaded with the parameter "a0" based on the base pointer of the called function (in the instruction 612). Additionally, the access of "a1" is illustrated by access to the register "edx" in the instruction 622. The register "edx" had been loaded with the parameter "a1" based on the base pointer of the called function (in the instruction 614).

In one embodiment, the programmer of the source code (that includes calls by implicit reference) determines and defines which function calls and/or which parameters within such calls include calls by implicit reference. In one such embodiment, functions that make a call by implicit reference and associated prototypes are known prior to compilation. In an embodiment, write access to variables passed by implicit reference may be managed similar to management of variables passed by regular reference through key words (e.g., "const" for C source code).

In an embodiment, the compiler 312 may determine and define which function calls and/or which parameters within such calls include calls by implicit reference. For example, the compiler 312 may perform a first pass compilation to generate a call tree, which is used to make such determinations with regard to calls by implicit reference.

To illustrate, FIG. 9 illustrates a call tree for a program, according to one embodiment of the invention. FIG. 9 illustrates a call tree 900, wherein blocks 902-936 represent functions and the arrows connecting the blocks 902-936 represent function calls.

The function 902 calls the function 916 and the function 906. The function 916 calls the function 928. The function 906 calls the function 918. The function 918 calls the function 928 and the function 930. The function 904 calls the function 906, the function 920, the function 922, the function 908, the function 910, the function 912 and the function 914. The function 920 calls the function 930 and the function 932. The function 908 calls the function 922. The function 922 calls the function 934. The function 910 calls the function 920 and the function 924. The function 924 calls the function 936. The function 912 calls the function 926. The function 926 calls the function 936. The function 914 calls the function 926.

As shown, a function may be called along different call sequences (different paths of the call tree 900). For example, the function 928 may be called by the function 916 or the function 918.

In one embodiment, the compiler 312 may convert each of the parameters called by reference to call by implicit reference. However, stack space may be wasted because of the need for place holders on the call stack. Accordingly, the compiler 312 may balance the call stack space resource against the resources of the processor 308 used for parameters called by reference that are placed on the call stack (the placement of pointers on the call stack and the de-referencing of such pointers for access).

For example, the call stack for local variables for the function 904 may include the following:
1) local variables that are not passed by implicit reference;
2) parameters passed by implicit reference for the function 908;
3) parameters passed by implicit reference for the function 910;
4) parameters passed by implicit reference for the function 906;
5) parameters passed by implicit reference for the function 920;

The call stack for the local variables for the function 902 may include the following:
1) local variables that are not passed by implicit reference;
2) parameters passed by implicit reference for the function 906;
3) place holder for parameters for the function 920 (needed because of the call stack for the function 904 above).

In one embodiment, the compiler 312 may mitigate this wasted space on the call stack (caused by the place holders for the parameter for the function 920) by using this wasted space on the call stack to store the local variables for the function 902 that are passed to the function 916. However, in such an embodiment, the size of the parameters on the call stack for the function 916 cannot exceed the size of the parameters on the call stack for the function 920. In an embodiment, the compiler 312 may determine not to convert the parameters for the function 920 from called by reference to called by implicit reference.

In one embodiment, only single level function calls are candidates for converting a call by reference to a call by implicit reference. In an embodiment, multi-level function calls are candidates for converting a call by reference to a call by implicit reference. For example, the function 902 calling the function 906 is a single level function call. The function 902 calling the function 918 through the function 906 is a multi-level function call.

In order for a multi-level function call to include calls by implicit reference wherein there is no wasted stack space, the passed set of parameters are to be in the same position for the different call structures. For example, assume that a first call sequence is the function 906 calling the function 918 calling the function 928. Also, assume that the second call sequence is the function 902 calling the function 916 calling the function 928. In order for a call by implicit reference parameter to be in the same position on the call stack throughout the call sequence, the number of parameters on the call stack for both the function 918 and the function 916 need to be equal.

In an embodiment, the compiler 312 may convert a parameter passed by reference to a parameter passed by implicit reference even though the different call sequences would normally cause such parameter not to be in the same position on the call stack. In particular, the compiler 312 may pad the call stack to make the offset the same for both call sequences. However, this padding may result in a bigger call stack in comparison to when the compiler 312 does not perform this conversion of parameters. In an embodiment, the program may be executed a number of times to determine how often a given call sequence is executed. Such execution allows for a determination of the actual cost of call stack space in comparison to passing of parameters by reference (not implicit reference). In an embodiment, this determination would include the type of target processor on which the program is executed as well as the collection of actual run time statistics. For example, a first target processor may execute faster using calls by implicit reference despite the padding of the call stack in comparison to a second target processor.

Thus, methods, apparatuses and systems for passing parameters by implicit reference have been described. Although the invention has been described with reference to specific exemplary embodiments, it will be evident that various modifications and changes may be made to these embodiments without departing from the broader spirit and scope of the invention. For example, while described with regard to passing parameters by implicit reference for functions, embodiments of the invention may pass parameters by implicit reference for any other type of module or code segment (such as a procedure). Therefore, the specification and drawings are to be regarded in an illustrative rather than a restrictive sense.

What is claimed is:

1. A method comprising:
compiling a program code to generate an executable program that comprises accessing a parameter on a stack using an implicit reference, wherein executing the executable program comprises:
executing a first module that includes a first instruction that causes a variable to be loaded onto the stack, wherein the first module includes a second instruction that calls a second module that passes the parameter by the implicit reference, wherein the parameter passed by reference is an address of the variable; and
executing the second module that includes a third instruction that accesses the parameter on the stack based on an offset of a base pointer of the second module.

2. The method of claim 1, wherein the parameter is not pushed onto the stack as part of the call from the first module to the second module.

3. The method of claim 1, wherein executing the first module that includes the first instruction that causes the variable to be loaded onto the stack comprises executing the first module that includes the first instruction to define the variable.

4. The method of claim 1, wherein the first module calls the second module through a third module, wherein a first calling sequence comprises the first module, the third module and the second module.

5. The method of claim 4, wherein a second calling sequence comprises the first module, a fourth module and the second module, wherein executing the first module comprises padding the stack such that the number of entries on the call stack are the same for the first calling sequence and the second calling sequence.

6. A method comprising:
receiving a program code that includes a first calling function having a call instruction to call a first called function that passes, by reference, a variable as a parameter of a number of parameters; and
compiling the program code to generate compiled instructions, wherein the compiled instructions do not include a compiled instruction to load the variable onto a call stack, during execution, based on the call instruction; and executing the compiled instructions that comprises accessing the parameter on the call stack using an implicit reference, wherein executing the compiled instructions comprises, executing a first module that includes a first instruction that causes the variable to be loaded onto the call stack, wherein the first module includes a second instruction that calls a second module that passes the parameter by the implicit reference, wherein the parameter passed by reference is an address of the variable; and executing the second module that includes invoking a third instruction that accesses the parameter on the stack based on an offset of a base pointer of the second module.

7. The method of claim 6, wherein the first calling function has a declaration instruction to allocate the variable, wherein the compiled instructions are to cause the variable to be loaded onto the call stack, during execution, based on the declaration instruction.

8. The method of claim 7, wherein the called function includes an access instruction, wherein the compiled instructions are to cause the variable to be accessed from the call stack, during execution, based on the access instruction.

9. The method of claim 8, wherein the compiled instructions are to cause, during execution, the variable to be accessed using a base pointer associated with the called function.

10. The method of claim 8, wherein the first calling function calls the called function by calling a separate function, wherein the separate function calls the called function.

11. The method of claim 10, wherein a first calling sequence comprises the first calling function, the separate function and the called function and wherein the first calling function calls the called function through a second calling sequence, the compiled instructions having a compiled instruction to pad the call stack such that the number of enters on the call stack are the same for the first calling sequence and the second calling sequence.

12. The method of claim 6, wherein receiving program code comprises receiving program code that includes a second calling function to call the first called function that passes, by reference, the variable as the parameter of the number of parameters, wherein an order of the number of parameters passed by the first calling function equals an order of the number of parameters passed by the second calling function.

13. The method of claim 6, wherein receiving the program code comprises receiving the program code that includes a second calling function, wherein the compiled instructions are to cause an order of the number of parameters on the call stack for the first calling function include parameters for the first called function and parameters for a second called function and wherein an order of the number of parameters on the call stack for the second calling function include parameters for the first called function and parameters for a third called function, wherein a size of the parameters for the third called function are not greater than a size of the parameters for the second called function.

14. An apparatus comprising:
a processor; and
a compiler to execute in the processor to generate assembly code instructions, wherein the assembly code instructions comprise a first procedure and a second procedure, wherein the first procedure includes a first assembly code instruction to cause a variable to be loaded onto a call stack, wherein the first procedure includes a second assembly code instruction to cause the second procedure to be called, which includes passage of a parameter by reference, wherein the parameter passed by reference is an address of the variable, the second procedure to include a third assembly code instruction that is to access the parameter on the stack based on an offset of a base pointer of the second procedure.

15. The apparatus of claim 14, wherein the assembly code instructions do not include an assembly code instruction to push the parameter onto the call stack as part of the call from the first procedure to the second procedure.

16. The apparatus of claim 14, wherein the first assembly code instruction is to define the variable.

17. A system comprising:
a secondary storage to store at least a part of a source code program, wherein the source code program includes a first subroutine that includes a first instruction to define a variable and a second instruction to call a second subroutine, wherein the call to the second subroutine includes passage of the variable by reference;
a dynamic random access memory to store at least a part of a call stack; and
a processor to compile the source code program to generate assembly code instructions, wherein the assembly code instructions do not cause the variable to be pushed onto the call stack based on the second instruction, wherein the processor is to generate an executable program from the assembly code instructions, the processor to execute the executable program that comprises access of the variable on the call stack using an implicit reference, wherein execution of the executable program comprises execution of a first module that includes a first instruction that causes the variable to be loaded onto the call stack, wherein the first module includes a second instruction that calls a second module that passes a parameter by the implicit reference, wherein the parameter passed by reference is an address of the variable, and wherein execution of the executable program comprises execution of the second module that includes invoking a third instruction that accesses the parameter on the stack based on an offset of a base pointer of the second module.

18. The system of claim 17, wherein at least one of the assembly code instructions is to cause the variable to be pushed onto the call stack based on the first instruction.

19. The system of claim 17, wherein the second subroutine includes a third instruction that is to access the variable, wherein at least one of the assembly code instructions is to cause access of the variable from the call stack.

20. A machine-readable storage medium that provides instructions, which when executed by a machine, cause said machine to perform operations comprising:
executing an executable program that comprises accessing a parameter on a stack using an implicit reference, wherein executing the executable program comprises,
executing a first module that includes a first instruction that causes a variable to be loaded onto a stack, wherein the first module includes a second instruction that calls a second module that passes the parameter by the implicit reference, wherein the parameter passed by the implicit reference is an address of the variable; and executing the second module that includes a third instruction that accesses the parameter on the stack based on an offset of a base pointer of the second module.

21. The machine-readable storage medium of claim 20, wherein the parameter is not pushed onto the stack as part of the call from the first module to the second module.

22. The machine-readable storage medium of claim 20, wherein the first module calls the second module through a third module, wherein a first calling sequence comprises the first module, the third module and the second module.

23. The machine-readable storage medium of claim 22, wherein a second calling sequence comprises the first module, a fourth module and the second module, wherein executing the first module comprises padding the stack such that the number of entries on the call stack are the same for the first calling sequence and the second calling sequence.

24. A machine-readable storage medium that provides instructions, which when executed by a machine, cause said machine to perform operations comprising:

receiving a program code that includes a calling function having a call instruction to call a called function that passes, by reference, a variable as a parameter; and compiling the program code to generate compiled instructions, wherein the compiled instructions do not include a compiled instruction to load the variable onto a call stack, during execution, based on the call instruction; and executing the compiled instructions that comprises accessing the parameter on the call stack using an implicit reference, wherein executing the compiled instructions comprises, executing a first module that includes a first instruction that causes the variable to be loaded onto the call stack, wherein the first module includes a second instruction that calls a second module that passes the parameter by the implicit reference, wherein the parameter passed bathe implicit reference is an address of the variable; and executing the second module that includes a third instruction that accesses the parameter on the stack based on an offset of a base pointer of the second module.

25. The machine-readable storage medium of claim 24, wherein the calling function has a declaration instruction to allocate the variable, wherein the compiled instructions are to cause the variable to be loaded onto the call stack, during execution, based on the declaration instruction.

26. The machine-readable storage medium of claim 25, wherein the called function includes an access instruction, wherein the compiled instructions are to cause the variable to be accessed from the call stack, during execution, based on the access instruction.

27. The machine-readable storage medium of claim 26, wherein the compiled instructions are to cause, during execution, the variable to be accessed using a base pointer associated with the called function.

* * * * *

UNITED STATES PATENT AND TRADEMARK OFFICE
CERTIFICATE OF CORRECTION

| | |
|---|---|
| PATENT NO. | : 7,356,812 B2 |
| APPLICATION NO. | : 10/677081 |
| DATED | : April 8, 2008 |
| INVENTOR(S) | : Herschleb |

Page 1 of 1

It is certified that error appears in the above-identified patent and that said Letters Patent is hereby corrected as shown below:

In column 13, line 42, in Claim 11, delete "enters" and insert -- entries --, therefor.

In column 16, line 10, in Claim 24, delete "bathe" and insert -- by the --, therefor.

Signed and Sealed this

Seventh Day of April, 2009

JOHN DOLL
*Acting Director of the United States Patent and Trademark Office*